Patented May 21, 1929.

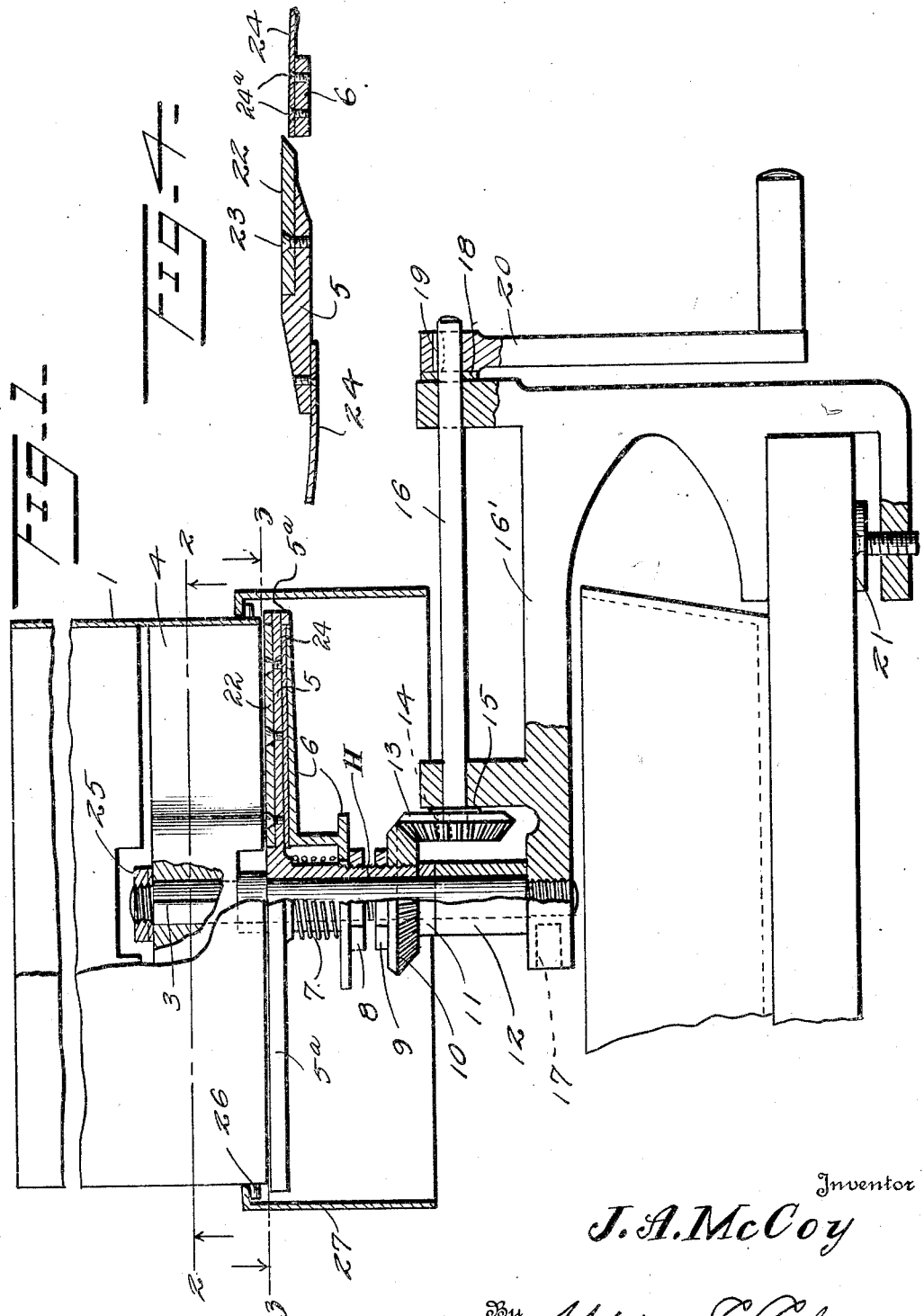

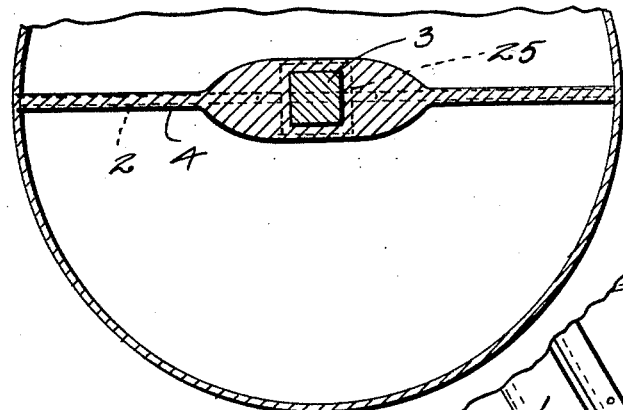
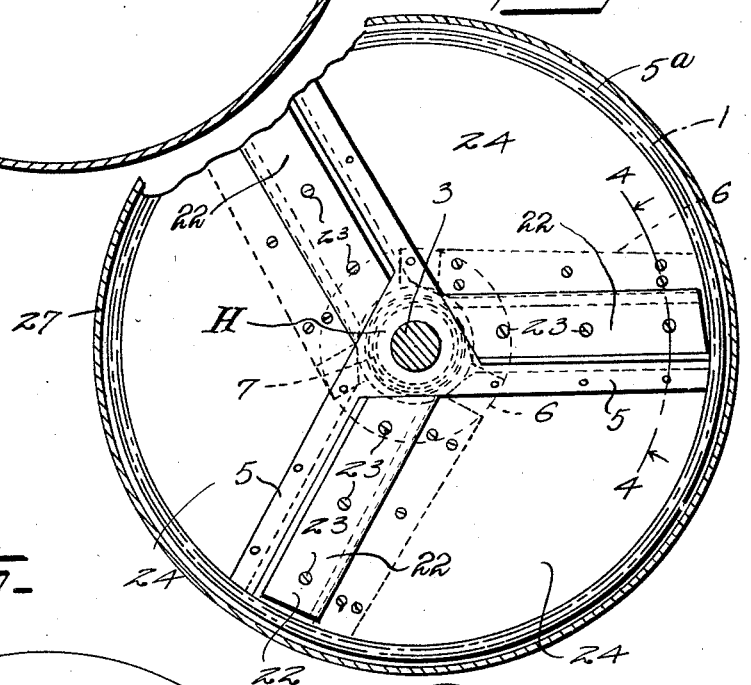
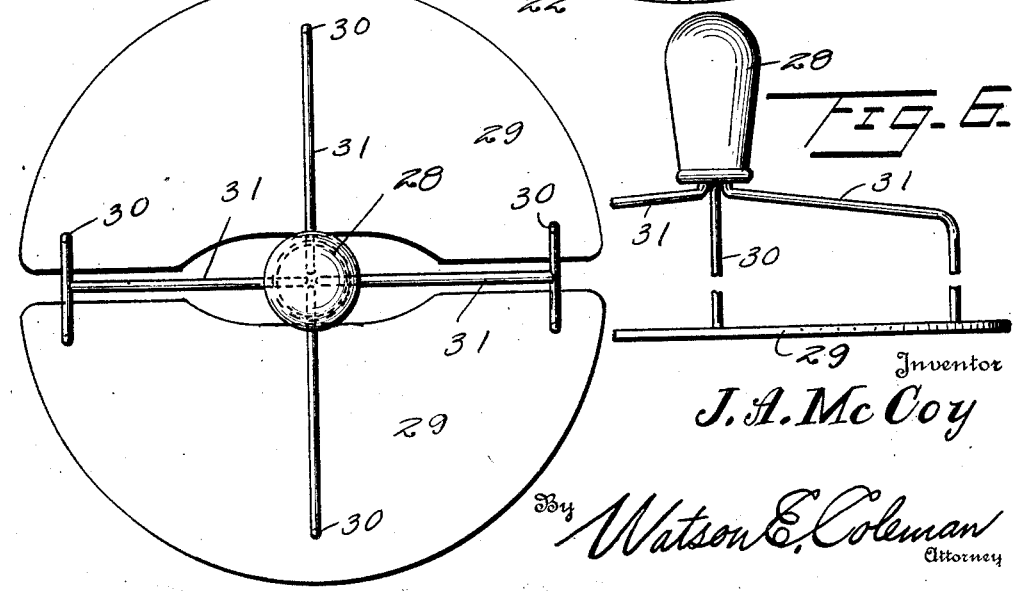

1,713,769

UNITED STATES PATENT OFFICE.

JAMES A. McCOY, OF HANOVER, MONTANA, ASSIGNOR OF ONE-HALF TO CALVIN BIRDWELL, OF HANOVER, MONTANA.

VEGETABLE AND FRUIT SLICER.

Application filed November 8, 1927. Serial No. 231,917.

This invention relates to rotary vegetable and fruit slicers and it consists in the novel features hereinafter described and claimed.

An object of the invention is to provide a slicer of the character indicated which is especially adapted to be used in hotels, restaurants and boarding houses where vegetables and fruits of various kinds are sliced in large quantities.

A further object of the invention is to provide a slicer of the character indicated which is of simple construction and which may be easily and quickly taken apart for cleansing and other purposes.

In the accompanying drawings:—

Fig. 1 is a fragmentary side elevational view of the fruit slicer with parts shown in section;

Fig. 2 is a horizontal sectional view thereof cut on the line 2—2 of Figure 1;

Fig. 3 is a horizontal sectional view thereof cut on the line 3—3 of Figure 1;

Fig. 4 is a fragmentary sectional view cut on the line 4—4 of Figure 3;

Fig. 5 is a top plan view of a presser used in conjunction with the slicer;

Fig. 6 is a fragmentary side elevational view of the presser.

The fruit and vegetable slicer comprises a cylindrical container 1 adapted to hold the vegetables and fruit for slicing. An upper barrier 2 is disposed diametrically across the container. The container is mounted upon a stud bolt 3 which is squared at its upper end portion. The said squared portion passes through a lower barrier member 4 which prevents the container from turning with relation to the stud. A hub H having at its upper end radiating arms 5, the outer ends of which are connected by a rim $5^a$, is journaled for rotation upon the stud at the lower end of the container and carries a series of knives hereinafter referred to. A spider 6 is mounted for axial and turning movement upon the hub H and a spring 7 urges the spider downwardly. A nut 8 is screwed upon the hub and bears against the spider and serves to raise or lower the spider with relation to the disk. A gear wheel 10 is threaded upon the hub of the disk and is held by a nut 9. A bearing 11 is located under the gear wheel 10 and rests upon a bearing support 12 carried at the lower end of the stud. A gear wheel 13 is held by means of a key 14 upon a drive shaft 16 journaled in a bracket 16′ adapted to be applied to a table or other support. A washer 15 is interposed between the inner side of the gear wheel 13 and the bracket. The bracket 16′ is provided with an opening 17 which may be tapped out for the reception of a brace (not shown) for steadying the bracket. A handle 20 is mounted upon the shaft 16 and secured by means of a key 19, a washer 18 being interposed between the handle and the bracket. The bracket 16 is provided with a clamp screw 21 which may be engaged against the under surface of the table top or other support. Cutting knives 22 are secured to the arms 5 of the hub H by means, such as screws 23. The arms 5 likewise have secured thereto corresponding radial edges of segments 24 which are preferably of thin steel, galvanized tin or some other flexible material. The opposite radial edges of these segments are secured to the arms of the spider, as indicated at $24^a$. A nut 25 is screwed upon the upper end of the stud 3 and bears against the upper edge of the barrier member 4. The container is provided at its outer surface with a series of lugs 26 over which a slip-over skirt 27 may pass, the said skirt preventing the slices from scattering when the machine is used at high speed.

A presser is used in conjunction with the slicer and consists of a handle 28 having rods 30 attached thereto and which are connected at their lower ends with presser plates 29. The inner edges of the plates 29 are spaced from each other so that the carrier members may be received between the said plates. The presser is provided with a cross rod 31 which prevents the presser plates from coming in contact with the knives.

In use the bracket 16′ is clamped at the edge of a table or other support by using the clamp screw 21. The fruit or vegetables to be sliced are placed in the container 1 and the presser plates 29 are placed upon the fruit or vegetables and are disposed one at each side of the barriers 2 and 4. By using the handle 20 the shaft 16 is rotated and through the intermeshing gear wheels 13 and 10 rotary movement is transmitted to the hub and through the arms thereof and the segments 24 to the spider 6. Thus the arms 5 are rotated about the axis of the stud 3 and inasmuch as the arms carry the blades 22, the said blades are moved under the lower edge of the barrier 4 which is held stationary by the stud. Thus as the blades move under the said barrier they cut slices from the fruit or vegetables for the reason that the fruit or vegetables are held against moving around in the container by the fixed barrier. These slices fall from the disk through the spaces between the edges of the blades 22 and the arms of the spider. By adjusting the nut 8 upon the sleeve of the disk, the spider is shifted vertically to increase or diminish the width of the spaces between the upper faces of the trailing edges of the segments 24, and the blades and consequently means are provided for regulating the thickness of the slices which are cut. The cut slices fall from the blades or knives into a pan or other receptacle which may be placed upon the table top and provided for the reception of the slices. The thin sheets 24 may flex so that the spider may be shifted with relation to the disk. The barriers 2 and 4 are made integral with the container 1 or may be attached thereto in any suitable manner.

Obviously some modifications might be made in the structure described without departing from the spirit of the invention. Thus it is immaterial how the blades 22 are attached to the members 5, whether by screws or other suitable means, and obviously the particular form of presser might be changed where large machines are being constructed where the presser would have to be heavier and stronger and press the food down with greater force against the cutting knives. While I have illustrated a washer 11 as a bearing supporting the beveled gear wheel 10, it is obvious that a ball bearing might be used in place thereof. Preferably the screw-threads at the lower end of the bolt 3 are left hand threads so that this bolt will not unscrew from the bracket when the machine is in operation.

In order to clean the slicer, the nut 25 is removed and then the container 1 may be removed from the squared portion of the shaft 3. A wrench may then be applied to the square end of the stud bolt 3 and the bolt unscrewed, after which the disk to which the knives, segments, spiders, spring, adjustment nut and gear 10 are all attached may be removed and cleaned without having to take the several elements off of the shaft 3.

Having described the invention what is claimed is:—

1. A slicer comprising a stud, a barrier fixed to the stud, a container surrounding the barrier, a hub surrounding the stud and having radiating arms, means for rotating the hub, knives carried by said arms, a spider having radial arms mounted upon the hub and axially and rotatably shiftable thereon, flexible sections connecting the arms of the spider with the arms of the hub, and means for adjusting the arms of the spider axially.

2. A slicer comprising a stud, a barrier carried by the stud, a container surrounding the barrier, a hub journaled upon the stud and having radiating arms, means for rotating the hub, knives carried by said arms, a spider rotatably and axially shiftable upon the hub and having radiating arms, a spring disposed between the arms of the hub and the spider, a nut screwed upon the hub and adapted to move the spider against the tension of said spring, and flexible plates connected at their opposite edges with the arms of the spider and of the hub.

In testimony whereof I hereunto affix my signature.

JAMES A. McCOY.